(12) United States Patent
Ro et al.

(10) Patent No.: US 7,925,721 B2
(45) Date of Patent: Apr. 12, 2011

(54) METHOD AND APPARATUS FOR CONVERTING THE MODALITY OF MULTIMEDIA CONTENTS TO SUPPORT THE QUALITY OF SERVICE ACCORDING TO MEDIA RESOURCE

(75) Inventors: Yong-Man Ro, Daejeon-si (KR); Cong Thang Truong, Daejeon-si (KR); Jin-Woo Hong, Daejeon-si (KR); Jae-Gon Kim, Daejeon-si (KR); Je-Ho Nam, Seoul (KR)

(73) Assignees: Electronics and Telecommunications Research Institute, Daejeon (KR); Korea Advanced Institute of Science and Technology (KAIST), Daejeon (KR)

( * ) Notice: Subject to any disclaimer, the term of this patent is extended or adjusted under 35 U.S.C. 154(b) by 0 days.

(21) Appl. No.: 10/575,433

(22) PCT Filed: Oct. 8, 2004

(86) PCT No.: PCT/KR2004/002569
§ 371 (c)(1),
(2), (4) Date: Jan. 16, 2007

(87) PCT Pub. No.: WO2005/036893
PCT Pub. Date: Apr. 21, 2005

(65) Prior Publication Data
US 2007/0214410 A1 Sep. 13, 2007

(30) Foreign Application Priority Data
Oct. 10, 2003 (KR) .................. 10-2003-0070499

(51) Int. Cl.
*G06F 15/177* (2006.01)
(52) U.S. Cl. .................................... 709/220; 715/202

(58) Field of Classification Search .............. 709/203, 709/220; 715/236, 235, 239, 202
See application file for complete search history.

(56) References Cited

U.S. PATENT DOCUMENTS
6,084,584 A * 7/2000 Nahi et al. ............... 715/864
(Continued)

FOREIGN PATENT DOCUMENTS
JP 2001-319069 11/2001
(Continued)

OTHER PUBLICATIONS

Rakesh Mohan, Adapting Multimedia Internet Content for Universal Access, Mar. 1999, IBM T.J. Watson REsearch Center.*

(Continued)

*Primary Examiner* — Shawki S Ismail
*Assistant Examiner* — Marie Georges Henry
(74) *Attorney, Agent, or Firm* — Haynes and Boone, LLP; Michael Shenker

(57) ABSTRACT

The present invention relates to modality conversion for supporting Quality of Service (QoS) according to media resources, which includes the steps of receiving a modality conversion descriptor in which the characteristics of the modality conversion of the multimedia contents are described, receiving the multimedia contents, and converting the modality of the multimedia contents into a modality determined according to a media resource and the modality conversion descriptor. According to the present invention, a systematic approach to a design for an overlap content value model is provided so that the conversion boundaries between modalities can be quantitatively calculated. As a result, the correlation between various modalities can be established in a single model, and modality conversion supporting the optimal QoS can be performed.

37 Claims, 4 Drawing Sheets

U.S. PATENT DOCUMENTS

| | | | |
|---|---|---|---|
| 6,195,088 B1* | 2/2001 | Signes | 715/201 |
| 6,310,601 B1* | 10/2001 | Moore et al. | 345/660 |
| 6,314,569 B1* | 11/2001 | Chernock et al. | 725/37 |
| 6,345,279 B1* | 2/2002 | Li et al. | 707/104.1 |
| 6,487,566 B1 | 11/2002 | Sundaresan | |
| 6,507,857 B1 | 1/2003 | Yalcinalp | |
| 6,565,609 B1 | 5/2003 | Sorge et al. | |
| 6,816,805 B1* | 11/2004 | Wadell | 702/155 |
| 6,959,318 B1* | 10/2005 | Tso | 709/203 |
| 6,970,602 B1 | 11/2005 | Smith et al. | |

FOREIGN PATENT DOCUMENTS

| | | |
|---|---|---|
| JP | 2002-169785 A | 6/2002 |
| JP | 2002-373136 | 12/2002 |
| JP | 2003-230086 A | 8/2003 |
| KR | 2002-8980 A | 2/2002 |
| KR | 2002-63830 A | 8/2002 |

OTHER PUBLICATIONS

Modality Conversion in Content Adaptation for Universal Multimedia Access, T.C. Thang, Mar. 2003.*

Modality Conversion in Content Adaptating for Universal Multimedia Access, T. C. Thang, Mar. 2003.*

Rakesh Mohan, Adapting Multimedia Internet Content for Universal Access, Mar. 1999, IBM T. J. Watson Research Center.*

Surendar Chandra, JPEG Compression Metric as a Quality Aware Image Transcoding, USENIX, Oct. 1999.*

Notice of Allowance for Korean Patent Application No. 10-2006-7007566, 2 pages.

Thang, Truong Cong et al., "CE Report on Modality Conversion Preferences (part 1)," Video Standards and Drafts, No. M9495, pp. 1-37, Mar. 4, 2003.

Thang, Truong Cong et al., "Modality Conversion in Content Adaptation for Universal Multimedia Access" International Conference on Imaging Science, Systems and Technology, Las Vegas, NV, USA, vol. 2, pp. 434-440, Jun. 23, 2003.

Supplementary European Search Report dated Nov. 21, 2008 for EP Application No. 04 774 782.9, 3 pages.

English Abstract for JP Publication No. 2001-319069, published Nov. 16, 2001, Patent Abstracts of Japan, 1 page.

English Abstract for JP Publication No. 2002-373136, published Dec. 26, 2002, Patent Abstracts of Japan, 1 page.

Surendar Chandra et al., "JPEG Compression Metric as a Quality Aware Image Transcoding", The $2^{nd}$ USENIX Symposium on Internet Technologies & Systems, Oct. 11-14, 1999.

* cited by examiner

FIG. 4a 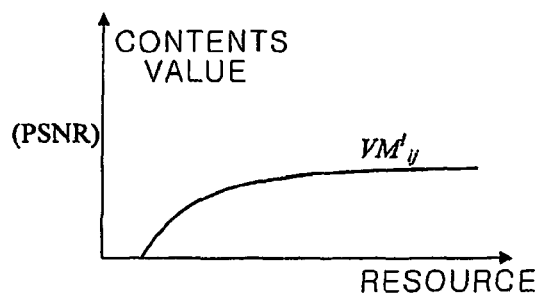 FIG. 4b 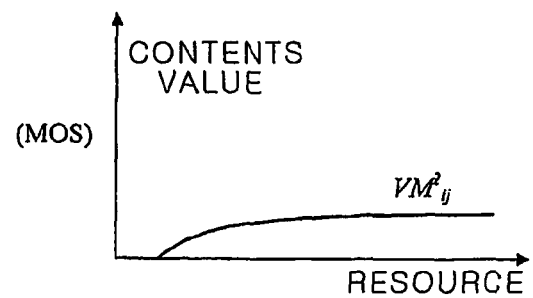
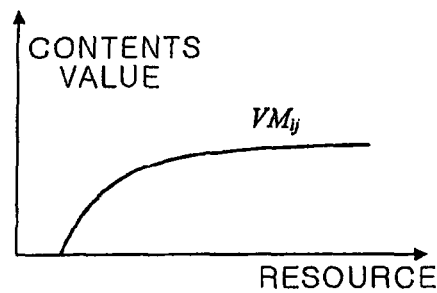
FIG. 4c

METHOD AND APPARATUS FOR CONVERTING THE MODALITY OF MULTIMEDIA CONTENTS TO SUPPORT THE QUALITY OF SERVICE ACCORDING TO MEDIA RESOURCE

TECHNICAL FIELD

The present invention relates to a method and apparatus for converting the modality of multimedia contents to support the quality of service according to media resources and, more particularly, to the modality conversion of multimedia contents to support the quality of service of the multimedia contents consumed in a ubiquitous computing environment.

BACKGROUND ART

The case where a terminal does not support content resources of the same kind but accesses and consumes universal multimedia is a new trend in multimedia communication. In a system for Universal Multimedia Access (UMA), the adaptive conversion of contents is the most important process for supporting the Quality of Service (QoS) for a user. The adaptive conversion of contents may be considered from two points of views. One is content transcoding that changes the bit rate (or quality) of contents without converting the modality of the contents, and the other is modality conversion that converts contents from one modality (e.g., video) to another modality (e.g., still image).

A content value model (or content value curve), which represents a relative correlation between a content value (or content quality) and a resource, has been discussed in some recent research. In a thesis "JPEG Compression Metric as a Quality Aware Image Transcoding" published in 2nd Symp. Internet Technologies and Systems" by S. Chandra and C. S. Ellis in October of 1999, and a thesis "JPEG Compression Metric as a Quality Aware Image Transcoding, 2nd Symp. Internet Technologies and Systems," Boulder, Colo.: USENIX, October 1999" by S. Chandra and C. S. Ellis, wide research into quality measurement specific to JPEG images was performed based on a compression rate closely related to the amount of resource. In a thesis "Adapting Multimedia Internet Content for Universal Access, IEEE Trans. Multimedia, Vol. 1, No. 1, pp. 104-114, March 1999" published in IEEE Trans. Multimedia, Vol. 1, No. 1, pp. 104-114 by Rakesh Mohan, John R. Smith, and Chung-Sheng Li, the case where a correlation between a content value and a resource is represented using a single concave function is discussed when a content representation design includes content versions having different modalities. However, the concave function does not properly represent a correlation between content values having different modalities.

Currently, most content values for QoS must be calculated according to specific modalities, respectively. The reason for this is that each modality has a specific characteristic and the qualities of different modalities may be measured in different dimensions. However, a systematic method of easily performing modality conversion and content scaling needs the combination of the content values for different modalities.

Intuitively, if the characteristics of contents for several resources, that is, restrictions, are given, a service provider (down) scales the contents to be suitable for the characteristics for the resources until the best QoS is provided to the user. However, in some cases, the quality of the scaled contents may not be suitable for the user. In this case, a solution to the above problem is to convert the modality of the contents into another modality. For example, when a bandwidth is excessively narrow, the transmission of a series of different images may be more suitable than the streaming and transmission of low-quality video. Such a method is a typical example of the conversion of a modality from video into images.

When viewed from a QoS point of view, the most important issue in the modality conversion is "which resource characteristic requires that a current modality is converted into a different modality." Most current systems supporting modality conversion operate only when terminals do not support specific modalities. However, when terminals support modalities but resources are restricted, any prior art inventions have not provided a systematic solution to modality conversion guaranteeing the best QoS. The present invention provides a method of finding modality conversion boundaries for the above solution based on QoS for modalities.

SUMMARY

Accordingly, an object of the present invention is to provide a time point and method of modality conversion, which guarantees the best QoS from a QoS point of view in different modalities as well as in the same modality under various content and device environments.

In relation to such an object, the present invention proposes (1) a method of designing an overlap content model for QoS using the scale factors for different content modalities, and (2) a description of the QoS of modality conversion into extended Markup Language (XML) for the automation of modality conversion.

The present invention provides a method of converting a modality of multimedia contents to support QoS of the multimedia contents according to media resources, including the steps of receiving a modality conversion descriptor in which characteristics of modality conversion of the multimedia contents are described, receiving the multimedia contents, and converting the modality of the multimedia contents into a modality that is determined according to a media resource and the modality conversion descriptor.

The modality conversion descriptor describes the content value curves and scale factors for the modalities of the multimedia contents. Each of the content value curves is obtained by combining content value curves measured according to two or more different qualities.

Preferably, the modality conversion step includes the steps of obtaining conversion boundaries using the content value curves and the scale factors for the modalities, determining the optimal modality for the media resource using the conversion boundaries, and converting the multimedia contents into the determined optimal modality.

Furthermore, the present invention provides an apparatus for converting a modality of multimedia contents to support QoS of the multimedia contents according to media resources, including a means for receiving a modality conversion descriptor in which characteristics of modality conversion of the multimedia contents are described, and a means for converting the modality of the multimedia contents into a modality that is determined according to a media resource and the modality conversion descriptor.

An approach proposed by the present invention is composed of an overlap content value model that represents the correlation between content values and resources to support QoS, and a design for the overlap content value model. In the present invention, contents are transmitted under heterogeneous network environments and consumed by various terminals. First, a data description structure, in which the characteristics of modality conversion of the multimedia contents to guarantee QoS are described, is received. Thereafter, the modality of the multimedia contents is converted into a modality for providing QoS according to the input data description structure.

Preferably, when the modality of the multimedia contents is converted to provide QoS according to the input data description structure, the modality of the multimedia contents is converted using the conversion boundaries between different content modalities. The step of converting the modality of the contents using the conversion boundaries between the different content modalities includes the steps of (A) finding the content value curves (modality curves) for modalities that represent correlations between content values and resources, (B) finding the scale factors for the modalities that represent the importance of the modalities, (C) mapping the modality curves to a single overlap content value model according to the scale factors, (D) obtaining conversion boundaries that are the intersection points of the modality curves in the overlap content value model, and (E) converting a current modality into a different modality using the obtained modality conversion boundaries to support QoS under a restriction.

At the step of finding the content value curves (modality curves) of the modalities that represent the correlations between the content values and the resources, the content value can be measured according to different qualities (PSNR, MOS, etc.). When the content value is related to various resources, the modality curves are changed to modality surfaces.

At the step of finding the scale factors of the modalities that represent the importance of the modalities, the scale factors are automatically or manually provided by a content author or provider. At the step of mapping the modality curves to the single overlap content value model according to the scale factors, the content value is obtained from a combination of values measured according to different qualities.

BRIEF DESCRIPTION OF THE DRAWINGS

FIG. 4 is a conceptual diagram showing the construction (mapping) from two quality curves into a single final modality curve for a video content modality, in which FIG. 4a is a graph showing a quality curve measured at a Peak Signal to Noise Ratio (PSNR), FIG. 4b is a graph showing a quality curve measured at a Mean Opinion Score (MOS), and FIG. 4c is a graph showing a combined single final modality curve in the case where each scale factor is one.

BEST MODE FOR CARRYING OUT THE INVENTION

Figure 1:
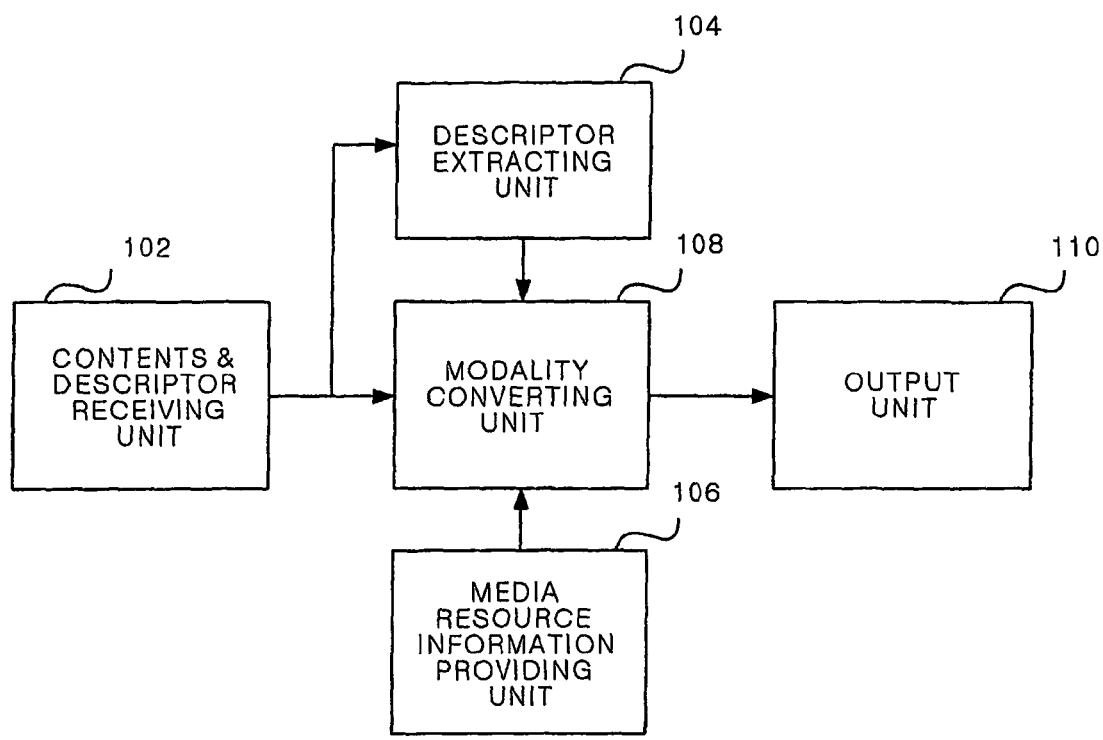
FIG. 1 is a block diagram showing an apparatus for converting the modality of multimedia contents in accordance with an embodiment of the present invention.

Hereinafter, with reference to the attached drawings, embodiments of the present invention are described in detail. In the drawings, the same reference numerals are used to designate the same or similar components or signals.

FIG. 1 is a block diagram showing an apparatus for converting the modality of multimedia contents in accordance with an embodiment of the present invention. A multimedia content and modality conversion descriptor receiving unit 102 receives multimedia contents and the modality conversion descriptor of the multimedia contents through a network, and provides the received multimedia contents and descriptor to a modality conversion descriptor extracting unit 104 and a multimedia content modality converting unit 108. The modality conversion descriptor extracting unit 104 extracts the modality conversion descriptor of the input multimedia contents and provides the modality conversion descriptor to the multimedia content modality converting unit 108. A media resource information providing unit 106 provides a restriction, which is related to the provision of the multimedia contents and is provided by the network or terminal, to the multimedia content modality converting unit 108. The multimedia content modality converting unit 108 determines the optimal modality for a media resource provided by the modality conversion descriptor and the media resource information, and converts the modality of the multimedia contents into the optimal modality. The multimedia contents, which are converted into a new modality, are provided to the network or terminal through an output unit 110.

An overlap content value model provided by the present invention can represent the correlations between the content values, resources and modalities. Contents can be represented along with the overlap content value model that represents content values according to different content modalities.

Figure 2:
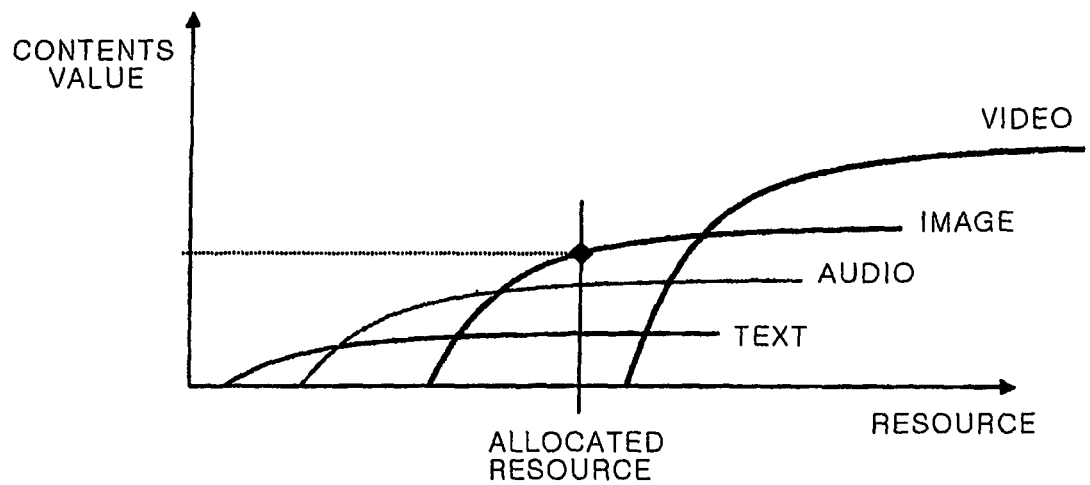
FIG. 2 is a view showing the concept of the overlap content value model for content items in accordance with the present invention.

FIG. 2 shows an example of a content value model for contents having a video modality. In FIG. 2, the content value curves for various modalities can be allocated by a content provider or an author, or through calculation in the terminal.

Figure 3:
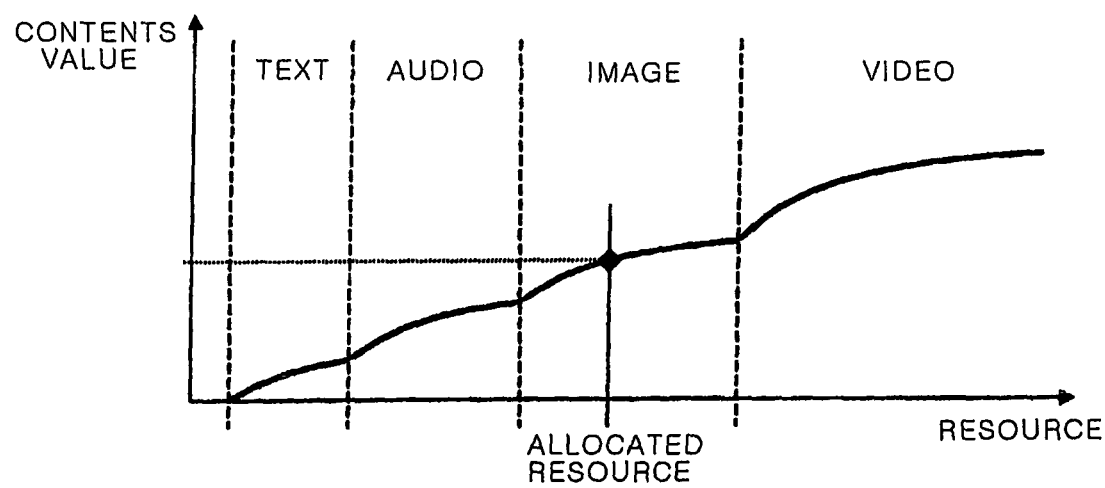
FIG. 3 is a conceptual view showing the final content value function for content items in accordance with the present invention.

FIG. 3 is a view showing the concept of the final content value function for content items in accordance with the present invention. The intersection points of modality curves represent the conversion boundaries between modalities as indicated by the dotted lines of FIG. 3. On the basis of the conversion boundaries, modality conversion can be quantitatively determined to maintain the maximum allowed QoS. The present invention includes a method of representing various content modalities by the overlap model as shown in FIG. 3 and determining a modality conversion point based on QoS.

A single modality curve is formed by a content scaling operation adopted by a content scaler. For example, video contents are scaled to match the characteristics of a specific resource in consideration of space resolution, time resolution and coded bits per pixel. To form an overlap content model from such a single content model, a single curve including various modalities must be produced on the single overlap content model.

It is assumed that the content value curve for the modality j of contents i is $VM_{ij}$. In this case, $j=1, \ldots, J_i$, and $J_1$ is the number of modalities adoptable by the contents i. Furthermore, $VM_{ij} \geqq 0$ must be fulfilled for all $j=1, \ldots, J_i$, and $j=1$ is an index representing the original modality of the contents. In this case, the content value function for the contents i is expressed by the following Equation 1, $$V_i = \max\{W_{ij} VM_{ij} | j=1, \ldots, J_i\} \qquad (1)$$

In Equation 1, $W_{ij}$ is a scale factor for the modality j of the contents i. In order to combine different modalities into a single model as proposed by Equation 1, the content author or provider automatically or manually allocates a proper scale factor $W_{ij}$ to each of the modalities, so that the content values for different modalities must reflect the relative importance thereof, and have common measurement units for common content values.

Furthermore, the content value curve of a modality may be measured according to various qualities. For example, a video modality can obtain content value curves by calculating a PSNR and a MOS. Accordingly, to represent a content value curve measured according to a specific quality, a term "quality curve" is used. As a result, a single modality curve may be formed of various quality curves.

$$VM_{ij} = \sum_{k} z_k \cdot VM_{ij}^k \quad (2)$$

In Equation 2, $VM_{ij}^k$, is a quality curve measured according to the quality type k of contents. Furthermore, $z_k$ is the scale factor of the quality type k to guarantee QoS. FIG. 4 is a graph showing an example of obtaining a modality curve, which shows a process of forming a single modality curve from two quality curves having differently measured content values (PSNR and MOS), respectively. The scale factor $z_k$ is a parameter for combining the differently measured content values into a single modality curve, which can be previously provided by a content provider according to a QoS schedule, or be automatically calculated.

Meanwhile, when contents are related to various resources, modality curves are converted into modality surfaces in a multi-dimensional space. Furthermore, the above-described method proposed by the present invention can be applied and valuable regardless in spite of consideration to many resources. Collectively, in the modality conversion for QoS, the analytic characteristics of the overlap content value model can be summarized as follows:

(1) The model includes various modality curves.
(2) The final content value function is composed of the upper parts of the overlap model.
(3) Each modality curve can be constructed by one or more content scaling operations.
(4) Each modality curve is characterized in that it is not reduced, and is not increased when the number of resources increases.

Figure 5:
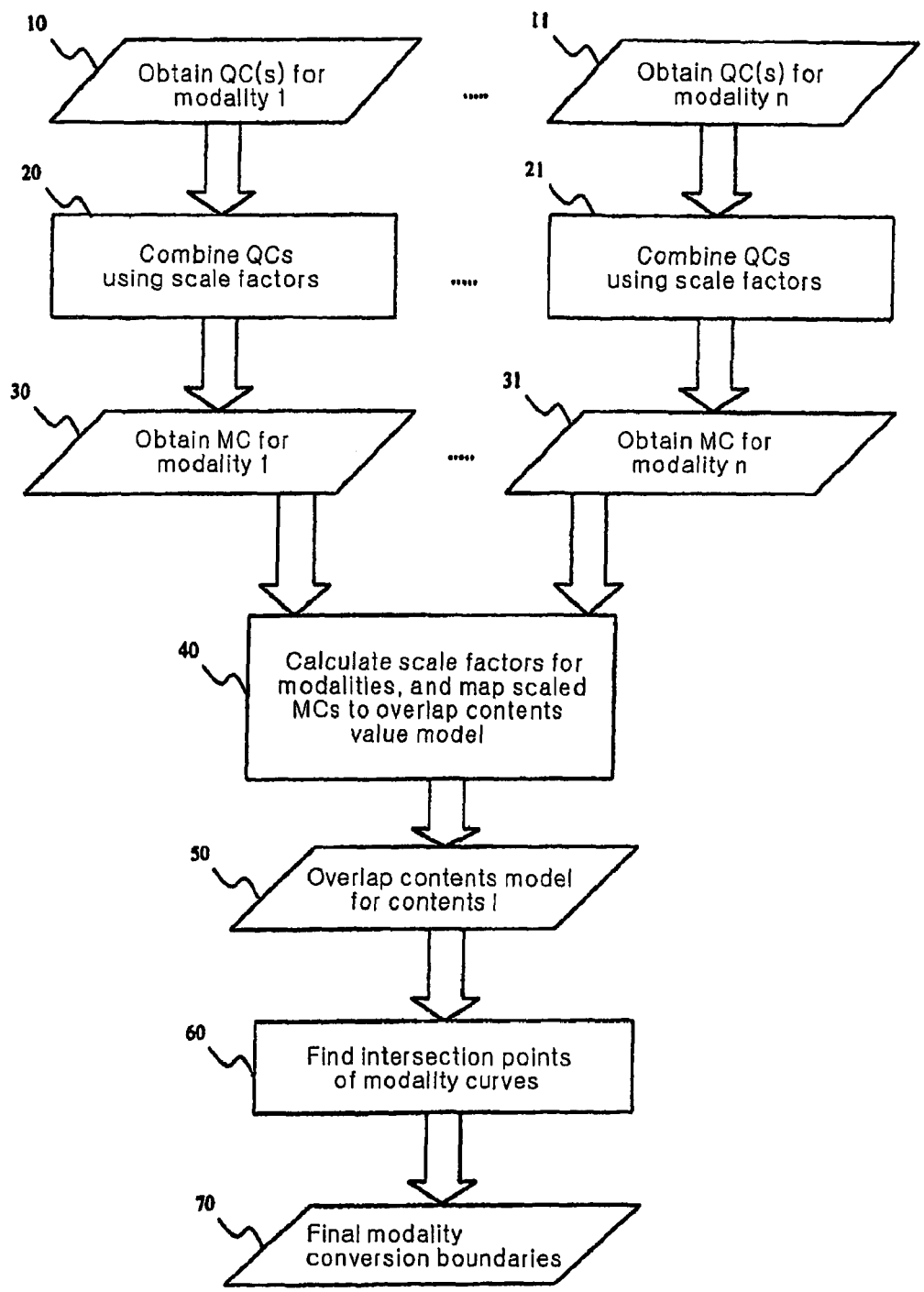
FIG. 5 is a flowchart illustrating a process of converting the modality of contents to support QoS.

A summarized entire modality conversion process is shown in the flowchart of FIG. 5. Quality curves are calculated for n modalities using various measurement methods at step 10 and 11. The calculated quality curves for each of the modalities are combined into a single modality curve based on scale factors, which depend on quality types, using Equation 2 at step 20 and 21. In this case, as a result, n modality curves are obtained at step 30 and 31. After the scale factors for the modalities are roughly calculated, the modality curves are mapped to a single model based on the obtained scale factors so as to form a single overlap content value model at step 40. In the single overlap content value model for the contents (step 50), the intersection points of the modality curves can be found at step 60. A solution to under which restriction a current modality should be converted into a different modality with QoS being supported can be obtained using the finally obtained modality conversion boundaries (step 70).

In forming the overlap content model in this system, metadata information representing parameters used needs to be represented in a structured form such as extended Markup Language (XML). Table 1 represents the modality conversion QoS technology, which is proposed by the present invention, in an XML form.

TABLE 1

```
<!-- ######################################################### -->
<!-- Definition of ModalityConversionQoSType                  -->
<!-- ######################################################### -->
<complexType name="ModalityConversionQoSType">
    <complexContent>
        <extension base="dia:DIABaseType">
            <sequence>
                <element name="ModalityCurve" type="ModalityCurveType"
                    maxOccurs="unbounded"/>
            </sequence>
        </extension>
    </complexContent>
</complexType>
<complexType name="ModalityCurveType">
    <complexContent>
        <extension base="dia:DIABaseType">
            <sequence>
                <element name="Modality" type="mpeg7:controlledTerm" minOccurs="0"/>
                <element name="ModScale" type="float"/>
                <element name="QualityCurve" minOccurs="0" maxOccurs="unbounded">
                    <complexType>
                        <sequence>
                            <element name="UtilityRef" type="IDREF"/>
                            <element name="UtiScale" type="float"/>
                        </sequence>
                    </complexType>
                </element>
            </sequence>
        </extension>
    </complexContent>
</complexType>
```

In Table 1, the semantics of "ModalityCurveType" are defined as shown in Table 2,

TABLE 2

| TITLE | DEFINITION |
| --- | --- |
| Modality | describe modalities of resources |
| ModScale | describe scale factors for modalities of resources |
| QualityCurve | describe content value curves for modalities of resources |
| UtilityRef | describe quality curves for modalities of resources |
| UtiScale | describe scale factors for quality curves |

The above-described embodiments are used only for those skilled in the art to easily understand the present invention, but are not intended to limit the scope of the present invention. Those skilled in the art must note that various modifications and changes of the above-described embodiments are possible. In principle, the scope of the present invention is defined by claims described later.

INDUSTRIAL APPLICABILITY

According to the construction of the present invention, a systematic approach to a design for an overlap content value model is provided so that the conversion boundaries between modalities can be quantitatively calculated. As a result, the correlation between various modalities can be established in a single model, and modality conversion supporting an optimal QoS can be performed. Furthermore, the present invention is used as a basis for precisely determining modality conversion and content scaling, so that UMA is effectively achieved.

The invention claimed is:

1. In a system including an apparatus for processing multimedia contents, a method for selecting a desired modality from a plurality of modalities each of which is adoptable by a multimedia item as an alternative to any other modality of the plurality of modalities, the desired modality being for adopting the multimedia item to one or more media resources, the method comprising:
   (1) the system obtaining data which define, for each said modality, a content value specification associated with a set of one or more resource values each of which is a value of the one or more media resources each of which is a resource of a network or terminal, the content value specification providing a content value for each of said one or more resource values in the associated set;
   wherein for at least one modality which is one of said modalities, the associated content value specification depends on each of a plurality of quality specifications that are different from each other, wherein each quality specification associates each resource value in the content value specification's associated set with a quality-specific content value for the modality, the associated set comprising a plurality of resource values;
   wherein for at least said one modality, the data defines the quality specifications to define the associated content value specification;
   (2) the system obtaining a resource value v1 belonging to at least one of the sets; and
   (3) the system selecting the desired modality from said modalities, the desired modality's content value specification's associated set containing the resource value v1.

2. The method of claim 1 wherein the sets associated with at least two of the modalities overlap; and
   the desired modality is selected using the content value specifications of the modalities whose associated sets contain the resource value v1.

3. The method of claim 2 further comprising converting the multimedia item's modality into the desired modality.

4. The method according to claim 3, wherein the one or more media resources are one or more resources of a network or terminal to which the multimedia item is provided in the desired modality.

5. The method according to claim 3, wherein the content value specifications are obtained from content value curves and scale factors for said modalities.

6. The method according to claim 5, wherein selecting the desired modality comprises:
   obtaining conversion boundaries using the content value curves and scale factors for the modalities; and
   determining the desired modality using the conversion boundaries.

7. The method according to claim 6, wherein the conversion boundaries are resource values at which the content value curves associated with overlapping sets intersect with each other.

8. The method of claim 1 further comprising transmitting the multimedia item in the desired modality over a network to a recipient.

9. The method of claim 8 wherein the sets associated with at least two of the modalities overlap; and
   the method further comprises:
   determining, from the content value specifications, sub-sets of said sets, wherein for each said sub-set, one of the content value specifications provides a maximum content value for each resource value in the sub-set, wherein the modality associated with said one of the content value specifications is the desired modality for each resource value in the sub-set;
   wherein at least one of the sub-sets includes a resource value belonging to at least two of said sets.

10. The method of claim 9 wherein determining the sub-sets comprises determining boundary resource values which are resource values at which at least two content value specifications provide equal content values, said boundary resource values comprising one or more boundaries of one or more sub-sets.

11. The method of claim 9 wherein for each modality, the associated content value specification is a scaled content value specification equal to a product of a preliminary content value specification and a scale factor, and the content value specifications are defined by the preliminary content value specifications and the scale factors.

12. The method of claim 2 wherein for each modality, the associated content value specification is a scaled content value specification equal to a product of a preliminary content value specification and a scale factor, and the content value specifications are defined by the preliminary content value specifications and the scale factors.

13. The method of claim 2 wherein at least two content value specifications associated with sets containing the resource value v1 provide respective different content values for the resource value v1, and the desired modality is associated with the content value specification which provides the greatest content value for the resource value v1.

14. The method of claim 1 wherein for at least said one modality, the data defines a scale factor for each said quality specification, wherein the associated content value specification is defined by the quality specifications and the corresponding scale factors.

15. The method of claim 14 wherein for at least said one modality, the associated content value specification is defined by the sum of the quality specifications scaled by the corresponding scale factors.

16. The method of claim 14 further comprising transmitting the multimedia item in the desired modality over a network to a recipient.

17. The method of claim 1 wherein one of the quality specifications is defined by PSNR (Peak Signal to Noise Ratio).

18. The method of claim 17 wherein another one of said quality specifications is defined by Mean Opinion Score (MOS).

19. In a system including an apparatus for processing multimedia contents, a method for building an overlap content model for a multimedia item which is available in any one of a plurality of alternative modalities, the overlap content model being for providing a desired modality from the plurality of modalities in response to a resource value which is a value of one or more media resources, the method comprising:
  (1) for each said modality, obtaining by the system a content value specification associated with a set of one or more resource values each of which is a value of the one or more media resources each of which is a resource of a network or terminal, the content value specification providing a content value for each of said one or more resource values in the associated set, wherein the sets associated with at least two of the modalities overlap;
  (2) determining by the system, from the content value specifications, sub-sets of said sets, wherein for each said sub-set, one of the content value specifications provides a maximum content value for each resource value in the sub-set, wherein the modality associated with said one of the content value specifications is the desired modality for each resource value in the sub-set;
  wherein at least one of the sub-sets includes a resource value belonging to at least two of said sets;
  wherein at least one said content value specification is obtained by combining quality specifications associated with respective different qualities, each quality specification providing, for each resource value in the associated set, a content value based on the respective quality.

20. The method of claim 19 wherein for at least said one content value specification, the associated quality specifications are scaled quality specifications, and said one content value specification is obtained from a sum of the scaled quality specifications.

21. In a system including an apparatus for processing multimedia contents, a method for selecting a desired modality from a plurality of modalities each of which is adoptable by a multimedia item as an alternative to any other modality of the plurality of modalities, the desired modality being for adopting the multimedia item to one or more media resources, the method comprising:
  (1) for each said modality, obtaining by the system a content value specification associated with a set of one or more resource values each of which is a value of the one or more media resources each of which is a resource of a network or terminal, the content value specification providing a content value for each of said one or more resource values in the associated set, wherein the sets associated with at least two of the modalities overlap;
  (2) obtaining by the system a resource value v1 belonging to at least two of the sets; and
  (3) selecting by the system the desired modality from the modalities whose associated sets contain the resource value v1, the desired modality being selected using the content value specifications of the modalities whose associated sets contain the resource value v1;
  wherein the method further comprises, after operation (3), converting by the system the multimedia item's modality into the desired modality;
  wherein the content value specifications are obtained from content value curves and scale factors for said modalities;
  wherein each of the content value specifications is obtained by combining quality curves that are measured according to two or more different qualities.

22. An apparatus for performing the method of claim 2.
23. An apparatus for performing the method of claim 3.
24. An apparatus for performing the method of claim 4.
25. An apparatus for performing the method of claim 9.
26. An apparatus for performing the method of claim 5.
27. An apparatus for performing the method of claim 19.
28. An apparatus for performing the method of claim 20.
29. An apparatus for performing the method of claim 1.
30. An apparatus for performing the method of claim 8.

31. A method of converting a modality of multimedia contents to support Quality of Service (QoS) of the multimedia contents according to media resources, comprising the steps of:
  receiving a modality conversion descriptor in which characteristics of modality conversion of the multimedia contents are described;
  receiving the multimedia contents; and
  converting the modality of the multimedia contents into a modality that is determined according to a media resource and the modality conversion descriptor,
  wherein the modality conversion descriptor describes modalities of the media resource, a scale factor for each of the modalities of the media resource, and for each modality describes a plurality of quality curves, and a scale factor for each quality curve, wherein for each modality the corresponding quality curves and the scale factors define a content value curve for the modality of the media resource, wherein each of the content value curves is obtained by combining quality curves that are measured according to two or more different qualities.

32. The method according to claim 31, wherein the media resource is a network or terminal to which the multimedia contents are provided.

33. The method according to claim 31, wherein converting the modality comprises:
  obtaining conversion boundaries using the content value curves and scale factors for the modalities;
  determining an optimal modality for the media resource using the conversion boundaries; and
  converting the multimedia contents into the determined optimal modality.

34. The method according to claim 33, wherein the conversion boundaries are values of the media resource corresponding to intersection points where the content value curves intersect with each other when the content value curves for the modalities overlap with each other according to the scale factors.

35. An apparatus for converting a modality of multimedia contents to support QoS of the multimedia contents according to media resources, comprising:
  means for receiving a modality conversion descriptor in which characteristics of modality conversion of the multimedia contents are described; and
  means for converting the modality of the multimedia contents into a modality that is determined according to a media resource and the modality conversion descriptor,
  wherein the modality conversion descriptor describes modalities of the media resource, a scale factor for each of the modalities of the media resource, and for each modality describes a plurality of quality curves, and a scale factor for each quality curve, wherein for each modality the corresponding quality curves and the scale factors define a content value curve for the modality of the media resource, wherein each of the content value curves is obtained by combining quality curves that are measured according to two or more different qualities.

36. The apparatus according to claim 35, wherein the modality conversion means comprises:

means for obtaining conversion boundaries using the content value curves and scale factors for the modalities; and means for converting the modality of the multimedia contents into the determined optimal modality.

37. The apparatus according to claim 36, wherein the conversion boundaries are values of the media resource corresponding to intersection points where the content value curves intersect with each other when the content value curves of the modalities overlap with each other according to the scale factors.

* * * * *